United States Patent [19]

Matthews

[11] Patent Number: 4,909,466

[45] Date of Patent: Mar. 20, 1990

[54] CHRISTMAS ORNAMENT HOOK

[76] Inventor: JoAnn Matthews, 11000 NW. 16th St., Pembroke Pines, Fla. 33026

[21] Appl. No.: 257,831

[22] Filed: Oct. 13, 1988

[51] Int. Cl.⁴ ............................................... A47H 1/16
[52] U.S. Cl. .......................................... 248/303; 24/27; 24/230.5 W; 24/237; 24/375; 248/340
[58] Field of Search ............... 248/302, 303, 339, 340; 24/230.5 W, 237, 375, 27

[56] References Cited

U.S. PATENT DOCUMENTS

| | | | |
|---|---|---|---|
| 540,108 | 5/1895 | Parker | 24/237 X |
| 745,066 | 11/1903 | Koch | 24/237 X |
| 1,106,653 | 8/1914 | Hollingsworth . | |
| 1,286,940 | 12/1918 | Cerny | 248/340 |
| 1,401,099 | 12/1921 | Anderson . | |
| 1,703,901 | 3/1929 | Schultz . | |
| 1,747,893 | 2/1930 | Fisher . | |
| 1,858,550 | 5/1932 | Kahle | 24/237 X |
| 2,050,757 | 8/1936 | Leon | 24/237 X |
| 2,074,841 | 3/1937 | Haimowitz | 24/237 X |
| 2,376,097 | 5/1945 | Stamm . | |
| 2,601,709 | 7/1952 | Reichardt | 24/230.5 W |
| 3,132,396 | 5/1964 | Berman | 24/27 |
| 3,855,723 | 12/1974 | McGahee . | |
| 4,100,658 | 7/1978 | Nikota | 24/237 X |
| 4,123,900 | 11/1978 | Sadowski . | |

FOREIGN PATENT DOCUMENTS 922764 2/1947 France ................... 24/237

Primary Examiner—David L. Talbott
Attorney, Agent, or Firm—Malin, Haley, McHale, DiMaggio & Crosby

[57] ABSTRACT

The invention relates to a hook for hanging ornaments on a Christmas tree and is equally useful as an article supporting hook for lightweight objects such as necklaces, keychains, laminated cards and the like. The hook is provided with an article supporting portion and an integral circular portion with a depending locking leg portion. In use the hook is placed over a supporting member such as the twig of a tree as a supporting rod with the twig or rod inserted through an open portion of the circular portion. Then the locking leg is manually manipulated such that the horizontal portion of the locking leg is retained behind an upper portion of the article supporting portion and due to the resiliency of the hook the locking leg is continually closed. To release the hook from the supporting member the locking member is manipulated such that the locking leg is released from the upper portion of the article supporting portion permitting the hook to be removed therefrom.

1 Claim, 1 Drawing Sheet

CHRISTMAS ORNAMENT HOOK

BACKGROUND OF THE INVENTION

The present invention relates to a clip for hanging articles such as ornaments on a tree or other articles which may be suspended from a display rack as found in jewelry stores, grocery stores, etc. There are presently available on the open market a variety of hooks, hangers and clip. However, none of the known hangers/clips are provided with a locking feature whereby the hanger is securely mounted to a supporting surface of some type. Additionally, the known devices are usually intended to hold only a single item.

SUMMARY OF THE INVENTION

It was with these known deficiencies of prior art hangers/clips that applicant was motivated to design the subject invention. The instant invention, when in its locked position can be conveniently and readily slipped over a support whether it be a tree branch or twig or a support rod on a display case as found in most business establishments. By manipulation of the hanger/clip the locking leg engages the article supporting leg and is then released resulting in the lock being set relative to the supporting twig or support rod. The lowermost en of the article supporting leg is made in the shape of a "J" to permit one or a plurality of articles to be suspended therefrom in the event that the hanger/clip is used to support articles other than ornaments on a Christmas tree.

OBJECTS OF THE INVENTION

An object of the invention is to provide a hanger/clip which is inexpensive and readily mounted to a supporting member.

Another object of the invention is to provide a hanger/clip which includes a positive locking means.

A further object of the invention is to provide a hanger/clip which has a plurality of potential uses.

Yet another object of the invention is to provide a hanger/clip which can be utilized to support a single or plurality of articles.

A still further object of te invention is the provision of a hanger/clip made of spring wire which allows the locking means to automatically self-engage once released.

These and other objects of the instant invention will become more apparent hereinafter, the instant invention will now be described with particular reference to the accompanying drawings which form a part of this specification wherein like reference characters designate the corresponding parts in the several views.

DETAILED DESCRIPTION OF THE DRAWINGS

Figure 1:
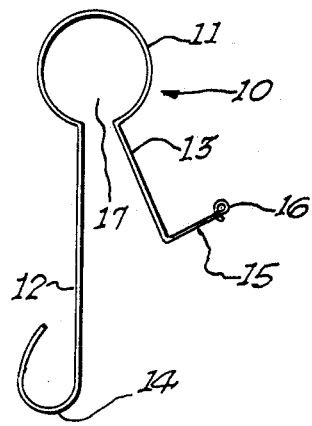
FIG. 1 is a vertical side view of the hanger/clip in its unlocked position.

Referring now to FIG. 1, there is shown the subject hanger/clip generally indicated by reference numeral 10. Hanger/clip 10 is formed of a single piece of spring wire with an uppermost circular portion 11 which has a pair of downwardly extending legs 12 and 13. Leg 12 being the longer leg and is provided with a "J"-shaped terminal end 14 for supporting the desired articles therefrom. An ornament may be placed on the end 14 and the "J"-shaped end may be pressed closed so that the ornament cannot slip off end 14. Shorter leg 13 extend downwardly from the other end of open circle 11 at an angle of approximately twenty degrees from vertical with a ninety degree bent portion 15 extending therefrom and terminating in a small loop 16.

As illustrated, hanger/clip 10 is in its relaxed or unlocked position. In order to mount the hanger/clip 10 one merely slides the hanger/clip 10 down until the support, whether it be the twig or branch of a tree or a horizontal support rod, passes through opening 17 and enters the center of circular portion 11. Merely by applying pressure with one's thumb to small loop 16 locking leg 13 is moved to the left of its position in FIG. 1. Continued pressure on small loop 16 will force small leg 13 further leftward beyond article supporting leg 13 until small loop 16 also passes there beyond. Once small loop 16 has passed leftward beyond article supporting leg 12 a slight manipulation of small loop 16 forcing small loop 16 to either the front or rear of article supporting leg 12 and then removal of the thumb pressure on small loop 16 results in locking leg 13 automatically assuming the position illustrated in FIG. 2 which is the locked position. The reason locking leg 13 automatically assumes the locking position is due to the fact that the hanger/clip 10 is made f spring wire which has an inherent resiliency and a desire to return to its unlocked position. However, this is prevented by the ninety degree bent portion 15 cooperating with locking leg 13 at their point of intersection to engage article supporting leg 12. As pointed out above, the resiliency of the spring wire continuously braces locking leg 13 against article supporting leg 12 and ninety degree bent portion 15 prevents its undesired release. To release the hanger/clip 10 from its support the reverse procedure is followed with one's thumb applying leftward pressure to small loop 16 until it passes beyond article supporting leg 12 and then manipulated forward or rearward, which ever direction is required to disengage locking leg 13 from article supporting leg 12 and then releasing pressure on small loop 16 whereby locking leg 13 will automatically return to the unlocked position as illustrated in FIG. 1.

Figure 2:
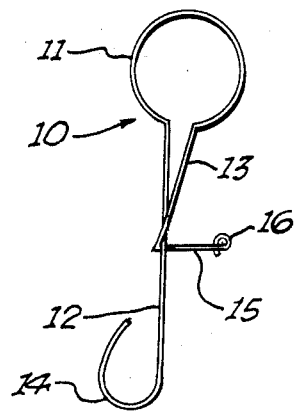
FIG. 2 is a vertical side view similar to FIG. 1, however the hanger/clip is shown in its locked position.

As already indicated FIG. 2 is an illustration of hanger/clip 10 with locking leg 13 locked into engagement with article supporting leg 12 by ninety degree bent portion 15.

Figure 3:
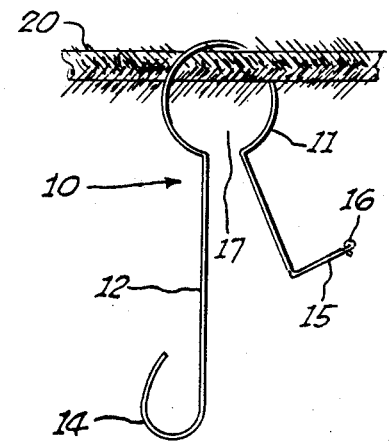
FIG. 3 is an illustration o the hanger/clip used with a Christmas tree as an ornament hook.

Referring now to FIG. 3, there is an illustration of the use of the novel hanger/clip 10 with a branch 20 of a Christmas tree or the like, thus permitting ornaments to be supported by J-shaped hook end 14 after locking leg 13 has been securely locked as shown in FIG. 2.

Figure 4:
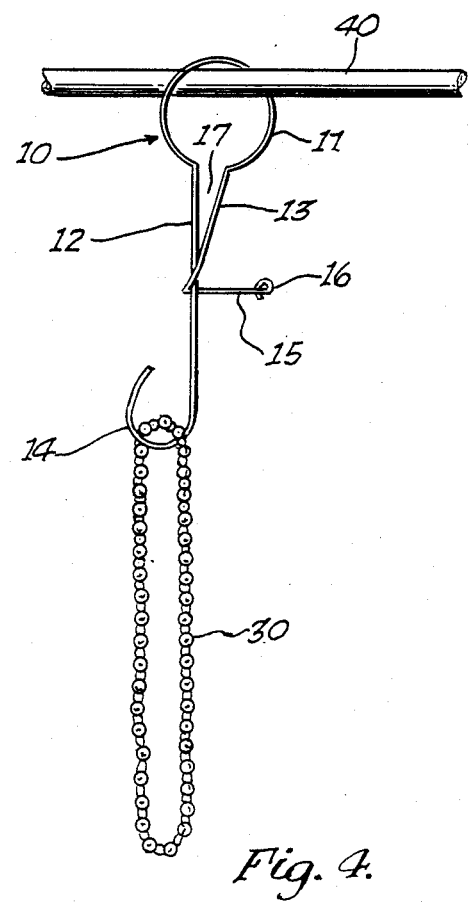
FIG. 4 is an illustration of the hanger/clip used in connection with a horizontal rod.

Referring now to FIG. 4, there is an illustration of the use of the novel hanger/clip 10 in conjunction with a supporting rod 40 wherein J-shaped hook is utilized to support articles such as a beaded necklace 30.

Figure 5:
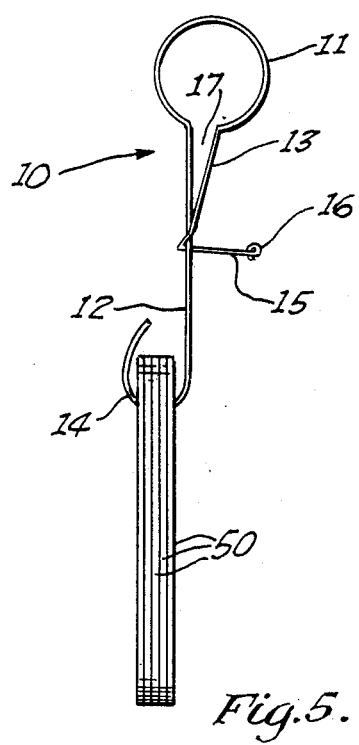
FIG. 5 is an illustration of the J-hook used to support a plurality of card like articles.

FIG. 5 is a further illustration of a potential use for J-hook 14 wherein it is used to support a plurality of laminated cards 50. The only requirement being that each of the laminated cards 50 be provided with an appropriately sized aperture for the end of J-shaped hook 14 to enter.

It is to be noted that shapes other than the J-shaped can be utilized depending upon the article to be suspended therefrom. Additionally, certain types of plastic may be utilized instead of spring wire to reduce manufacturing costs. Likewise, the size of the hanger/clip may be increased or decreased as required. Whatever material is used it must have the characteristic of resiliency and additionally it must be resistant to cracking and fracturing.

While the invention has been described in its preferred embodiment, it is to be understood that words which have been used are words of description rather than limitation and that changes may be made within the purview of the appended claims without departing from the full scope of the invention.

Having thus described my invention,

I claim:

1. A hanger clip for supporting articles of manufacture, said hanger clip comprising an article supporting portion having an upwardly extending leg projecting therefrom; a resilient circular portion having a first end and a second end with an opening therebetween when in its relaxed position; said first end of said resilient circular portion integrally formed with said upwardly extending leg; a locking leg portion integrally formed with said second end of said resilient circular portion comprised of an outwardly bent L-shaped leg portion; said resilient circular portion and said locking leg portion cooperating to releaseably lock said hanger clip to a supporting member when said hanger clip is placed such that said supporting member enters said opening between said first and second ends and said locking leg is then manipulated to close said opening and lock said locking leg behind said upwardly extending leg portion whereby an article of manufacture may then be suspended from said article supporting portion;

said article supporting portion of said hanger clip is J-shaped;

said locking leg portion comprises a first leg portion extending downwardly from said second end of said resilient circular portion and a second leg portion extending outwardly coplanar with said resilient circular portion at a right angle to said first leg portion to permit locking engagement with said upwardly extending leg projection;

said second leg portion of said locking leg terminates in an overturned circular loop to present a smooth contact surface;

said entire hanger clip is made of resilient spring wire.

* * * * *